(12) United States Patent
McMurtry et al.

(10) Patent No.: US 6,601,311 B2
(45) Date of Patent: *Aug. 5, 2003

(54) METHOD OF CALIBRATING A SCANNING SYSTEM

(75) Inventors: David R McMurtry, Wotton-under-Edge (GB); Alexander T Sutherland, Edinburgh (GB); David A Wright, Edinburgh (GB)

(73) Assignee: Renishaw PLC, Gloucestershire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/191,460

(22) Filed: Jul. 10, 2002

(65) Prior Publication Data

US 2002/0174555 A1 Nov. 28, 2002

Related U.S. Application Data

(63) Continuation of application No. 09/701,735, filed as application No. PCT/GB00/01315 on Apr. 7, 2000, now Pat. No. 6,434,846.

(30) Foreign Application Priority Data

Apr. 8, 1999 (GB) .............................................. 9907868

(51) Int. Cl.[7] .............................................. G01B 21/04
(52) U.S. Cl. .............................. 33/502; 33/503; 33/556; 33/504; 702/95
(58) Field of Search ........................ 33/502, 503, 504, 33/556, 559; 702/95

(56) References Cited

U.S. PATENT DOCUMENTS

| 3,986,007 | A | 10/1976 | Ruoff, Jr. ..................... 702/95 |
| 4,523,450 | A | 6/1985 | Herzog ......................... 33/502 |
| 4,939,678 | A | 7/1990 | Beckwith, Jr. ................ 702/95 |
| 5,214,857 | A | 6/1993 | McMurtry et al. ............. 33/502 |
| 5,501,096 | A | 3/1996 | Stettner et al. ................ 33/503 |
| 5,594,668 | A | 1/1997 | Bernhardt et al. ............. 33/504 |
| 6,161,079 | A | 12/2000 | Zink et al. ..................... 33/503 |
| 6,434,846 | B1 * | 8/2002 | McMurtry et al. ............ 33/502 |

FOREIGN PATENT DOCUMENTS

| EP | 0 318 557 | 6/1989 |
| EP | 0 599 513 A | 6/1994 |

OTHER PUBLICATIONS

Miguel et al., "A review on methods for probe performance verification", Measurement, GB, Institute of Measurement and Control, London, vol. 23, No. 1, 1998, pp. 15–33.

* cited by examiner

Primary Examiner—G. Bradley Bennett
(74) Attorney, Agent, or Firm—Oliff & Berridge PLC

(57) ABSTRACT

A method of calibrating a scanning system comprising a machine and a measuring probe, includes the steps of error mapping the system statically and qualifying the stylus tip so that the system will provide accurate measurements, determining the positions of a number of datum points on the surface of an artefact with the probe stylus in contact with the workpiece and at zero deflection normal to the surface, scanning the surface through the datum points at a nominal stylus deflection and at the maximum speed which provides repeatable position measurements to make a second determination of the positions of the datum points, determining the errors attributable to the scanning process by subtracting the positions obtained in the first and second determinations, and storing the error values for correction of subsequent measurements of similar artefacts.

8 Claims, 2 Drawing Sheets

METHOD OF CALIBRATING A SCANNING SYSTEM

Figure 1:
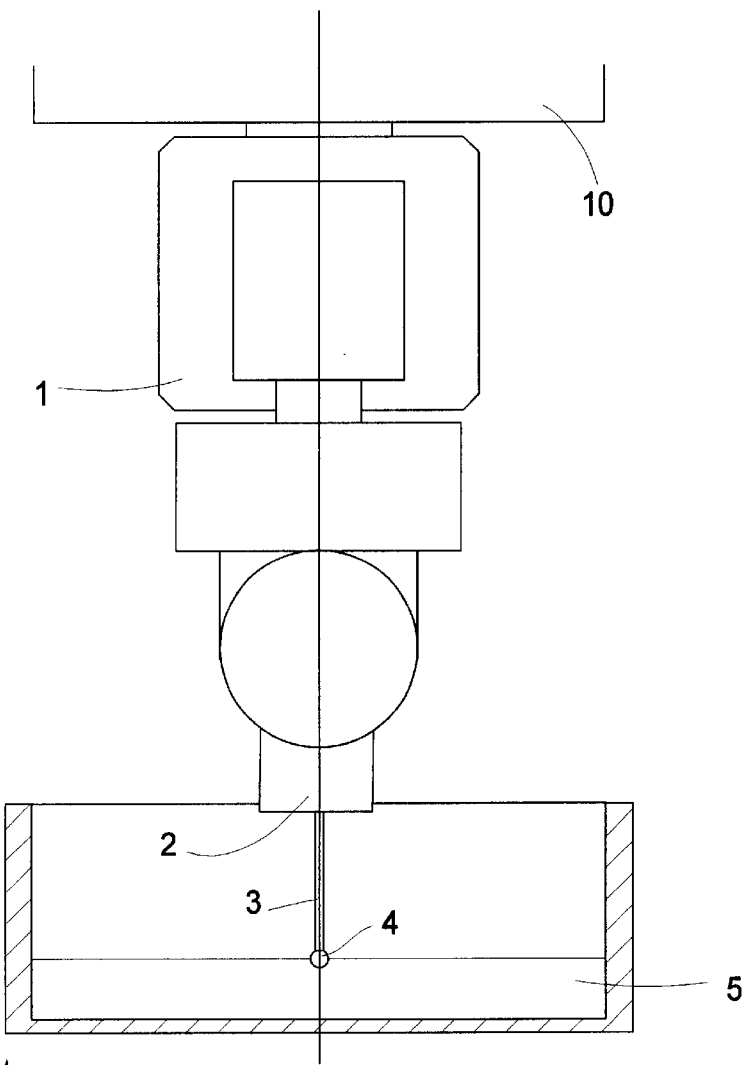

This is a Continuation of Application No. 09/701,735 filed Dec. 4, 2000 now U.S. Pat. No. 6,434,846, which in turn is a U.S. National Stage of PCT/GB00/01315, filed Apr. 7, 2000. The entire disclosure of the prior application(s) is hereby incorporated by reference herein in its entirety.

The present invention relates to a method of calibrating a scanning system. A scanning system in this specification should be understood to mean a combination of a machine and a probe which together are capable of use in scanning an artefact in order to obtain information about its size, shape or surface contours. The machine may be a co-ordinate measuring machine (CMM), or robot, and the probe is an analogue probe which may have a workpiece-contacting stylus or may be a non-contact probe. The machine has measuring devices for measuring the movement of the machine parts in three nominally orthogonal directions (referred to as X,Y and Z axes), and the probe includes measuring transducers for producing outputs indicative of the is deflection of the probe in three nominally orthogonal directions (referred to as the a,b and c axes).

In general terms the present invention relates to a method of calibrating a scanning system dynamically, whereby errors in the system produced when scanning an artefact at different scanning speeds (and hence at difference accelerations) may be mapped, without the need to calibrate the probe itself.

Methods of correcting machines for acceleration induced errors are known.

One example of such a method is described in European Patent No. 318557. In this method a first article from a batch of nominally identical articles is scanned at a relatively slow speed, noting the measurements of the positions of a number of datum points on the article. The scanning operation is repeated at a relatively fast speed noting the measurements of the positions of the same points. Any difference in the measurements are noted as errors in a correction table. Thereafter all of the articles are scanned at the relatively fast speed taking measurements of the positions of corresponding points on each article, and these measurements are corrected for machine accelerations using the previously noted errors.

This method requires the probe to have been accurately calibrated before the measurements are taken, and does not account for machine errors other than dynamic deflections.

Another example of such a method is described in U.S. Pat. No. 5,594,668. This patent discloses scanning a ring gauge at different velocities, and hence at different accelerations of the machine slides, and determining the differences in the measured X,Y values of a plurality of datum points as a function of the acceleration components of the machine in the X and Y directions. These measurements are repeated with the ring gauge positioned at several different places in the machine's working envelope, and a set of correction data is stored for subsequent correction of the measurements of workpieces.

This method produces a map of corrections based on an accurately known gauge of symmetrical form, but does not necessarily produce a result which is applicable to a non-symmetrical workpiece, and does not take account of surface finish, or of different materials.

We have found that when using a probe having a workpiece contacting stylus, stylus slippage on the surface being used for the calibration can be a source of significant errors in the measurements of the positions of the points on the surface which are used as the datum points, leading to errors in the calibration/correction data.

The errors occur because the simple correlation assumed between the machine displacement and probe stylus deflection is destroyed by stylus slippage.

Stylus slippage occurs when, for whatever reason, the probing force component in a direction in the plane of the surface contacted would otherwise exceed the product of the force component in the direction normal to the surface and the effective friction coefficient. Such a situation can arise from one or more reasons, e.g. the commanded machine direction may not be exactly normal to the contacted surface, and/or machine inaccuracies may lead to the machine not travelling accurately in the commanded direction, and/or probe inaccuracies (or design) may cause the probing force direction to differ from the probe deflection direction.

The present invention provides a method of calibrating a scanning system in which the effects of stylus slippage caused by probe and/or machine inaccuracies are minimised.

According to one aspect of the present invention there is provided a method of calibrating a scanning system comprising the following steps:

a) moving the probe stylus towards a surface of an artefact in a direction which is nominally normal to the surface, and contacting the surface at a number (N) of specific datum points on the surface, b) using only the components of machine movements and probe stylus deflections which are normal to the surface at the points of contact therewith, making a determination of the positions of each of the datum points at the instant that the stylus tip is just in contact with the surface, c) scanning the surface of the artefact at a predetermined finite probe stylus deflection and at a plurality of different speeds each time nominally passing through the datum points several times, d) using the components of machine movements and probe stylus deflections which are normal to the surface, making further determinations of the apparent positions of each of the (N) datum points, and recording any differences in the normal direction from the positions determined in step b) for each speed, e) from the differences recorded in step d) identifying the highest scanning speed at which the variations in the measurements of the positions of the datum points noted during each scan remain within a predetermined tolerance, f) storing the identified speed and the differences in the measurement at that speed.

The method according to the invention is based on two theories. The first is that there can be no stylus slippage in the directions normal to the surface of the artefact. All stylus slippage must be parallel to the surface. The second is that the above-mentioned probe inaccuracies become negligible when the probe deflection is zero.

Thus by utilising only the components of machine movement and stylus deflection which are normal to the surface and determining these values when the stylus is just in contact with the surface, but is not deflected, the resulting measurements of the datum points are free of probe errors, and free of errors due to stylus slippage.

The determination of the position of each datum point at the instant the stylus tip is just in contact with the surface of the artefact may be achieved by driving the probe into the surface and synchronously recording the components of machine movements and probe deflections which are normal to the surface until the probe deflection reaches a predetermined limit. The recorded values are then extrapolated back to determine the position of the machine in the direction normal to the surface when the stylus was just in contact with the surface.

Alternatively, and preferably, the probe is driven into the surface until the stylus deflection reaches a predetermined limit and is then reversed at a known and controlled low velocity. During the reversal the components of machine movements and probe deflections normal to the surface are recorded synchronously until the stylus leaves the surface. The recorded values are then extrapolated to determine the position of the machine in the direction normal to the surface when the stylus just left the surface. This is effectively the same as the position when the stylus just contacted the surface.

During the scanning step, the outputs of the measuring transducers of the probe in the a,b, and c axes are transformed into incremental values of X, Y, and Z using a probe transformation matrix.

Once the maximum scanning speed has been established by this method a map of the errors in the direction normal to the surface at the (n) points can be stored along with the data relating to the scanning speed, the particular artefact or feature, the particular CMM and the part location and orientation on the CMM, the particular probe and stylus configuration, and the probe matrix and nominal probe deflection used.

Instead of storing this data in the machine computer, possibly along with many other error maps for other workpieces, in accordance with a novel feature of the invention, this data may be stored outside of the machine as part of, or in association with, the part program associated with a workpiece. A part program is the software program which is loaded into the computer of a measuring machine when a workpiece is to be measured, and which identifies to the measuring machine both the details of workpiece to be measured, and the moves to be accomplished by the machine in order to make the required measurements.

In order to avoid machine errors affecting the accuracy of the results it is preferable to error map the machine and qualify the stylus tip as to its diameter and position relative to the axis of the machine spindle.

Thus according to a further aspect of the present invention a method of dynamically calibrating a scanning system comprises the steps of:

a) error mapping the system statically,
b) determining the diameter of the stylus tip and its position relative to the probe using a datum sphere,
c) determining the positions of a plurality of datum points on a surface of an artefact with the probe stylus in contact with said surface and when at least the component of the stylus deflection normal to the surface is zero,
d) scanning the surface of the artefact passing through the datum points at a nominal stylus deflection and at the maximum speed at which the results are repeatable within a given tolerance,
e) subtracting the positions of the datum points determined with zero normal deflection of the stylus from the positions of the datum points produced during the scanning step to determine the measurement errors attributable to the scanning process in the direction normal to the surface at the nominal deflection,
f) storing the error values for subsequent correction of measurements taken on a similar artefact at the same speed and deflection.

Figure 2:
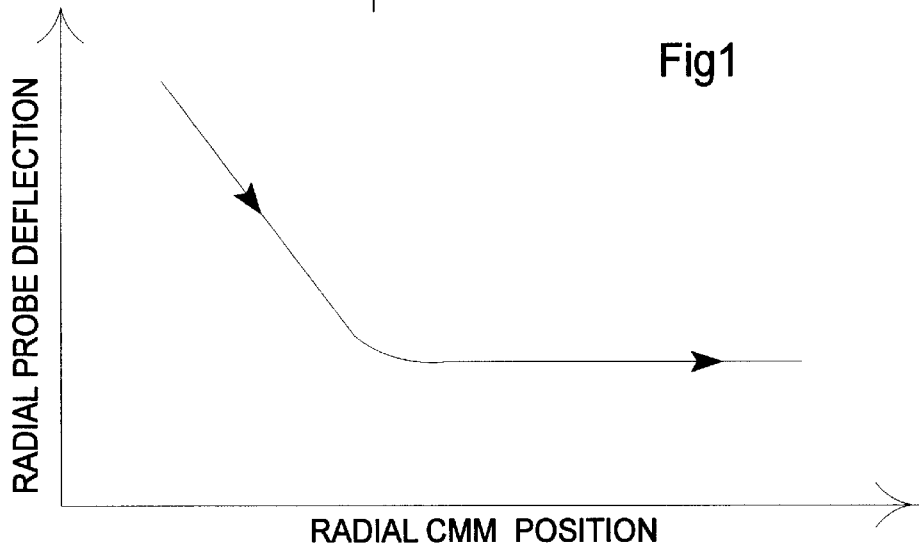
Figure 3:
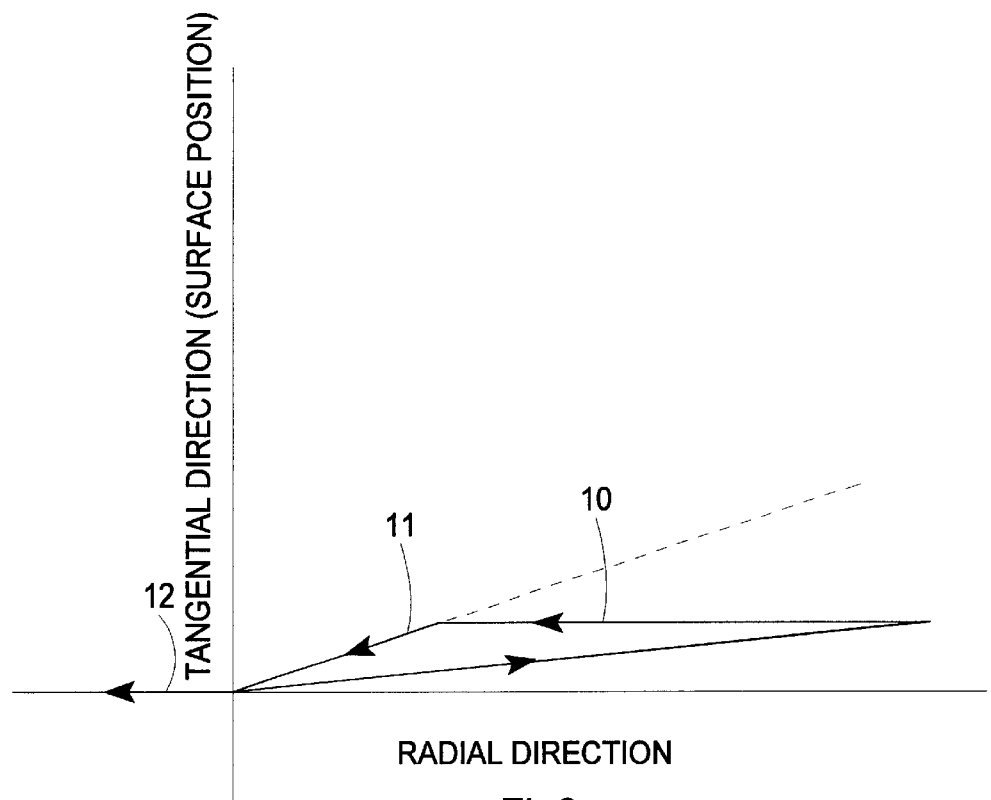
Figure 4A:
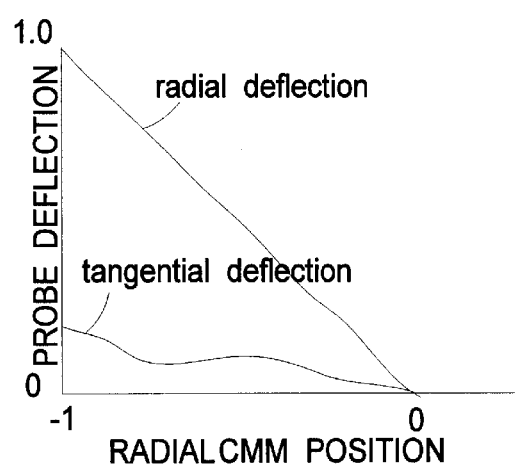
Figure 4B:
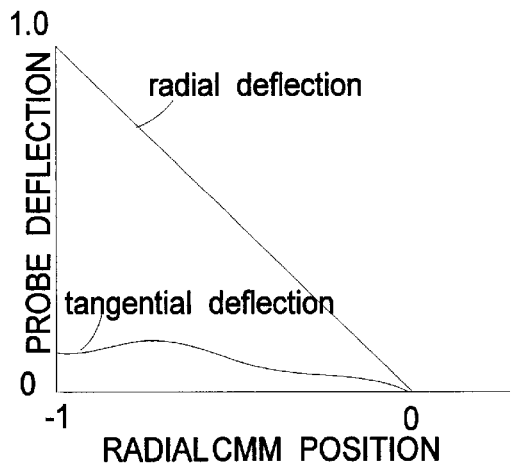

Preferred embodiments of the invention will now be more particularly described with reference to the accompanying drawings in which:

FIG. 1 illustrates a scanning system including a probe head attached to the quill of a CMM on which is mounted a scanning probe in position for measuring a bore in a workpiece, FIG. 2 illustrates in principle the relationship between the radial position of the CMM and the radial deflection of the stylus of the probe during a measurement step of the method of the invention, FIG. 3 illustrates the a and b axis outputs of an imperfect probe when the machine is reversed during the measuring step, and FIGS. 4a and 4b illustrate respectively the actual output components of the probe displacement vector in the estimated radial and tangential directions when the direction of the movement of the CMM is not exactly radial, compared with the outputs when the radial component is truly radial.

Referring now to FIG. 1, there is shown a probe head 1 mounted on a machine quill 10. The probe head carries a measuring probe 2 which has a stylus 3 with a stylus ball 4 at its free end. The stylus is shown in contact with a bore in a workpiece 5. The bore has nominal radius R and has its centre O at a nominal position $X_c$, $Y_c$, and $Z_c$ in the machine axis coordinates. The stylus ball has a radius r which is predetermined.

It is preferable that some preliminary steps are taken to get the best results from the present method. For example, the machine, with the probe attached is preferably error mapped by conventional means e.g., laser interferometry, so that machine errors can be calibrated out of the results. Also the probe should be pre-qualified as to the size (diameter) of the stylus tip using a known qualification procedure on a datum sphere.

As a first step in the calibration method the probe may be "zeroed" in its free condition. This simply involves taking readings from the probe measurement transducers when there is no contact or inertial force acting on the stylus, and setting these to zero in all three axes, or alternatively, storing these readings so that they can be subtracted from all subsequent readings. Note that multiple readings may need to be taken and averaged to take account of noise, vibration etc. of the machine.

In a further step, an estimate of the position of the centre of the bore in X, Y, and Z coordinates may be made, by taking measurements of points at least at three positions around the surface, from which the position of the centre can be calculated in known manner, and using a relevant default probe transformation matrix as a starting point to convert the probe a,b,c outputs into machine X,Y,Z coordinates. This step may be useful because the next step of the calibration method requires the bore to be contacted while the machine is driven in a direction which is as near to the radial direction as possible. However, it is not important that the position of the centre of the circle is known accurately at this stage. This step may therefore not be necessary particularly if the nominal position, size and orientation of the bore are sufficiently accurate.

As explained above any slippage occurs in the local plane of the surface. Thus it has zero component in the true radial direction, and only a very small component in the approximate radial direction. Also, once the outputs of the measuring devices in the probe have been zeroed, or calibrated with the probe in its undeflected state, all probe measurements made with the stylus in its undeflected state will be substantially free from probe errors.

Since it is not normally possible to make any measurements directly when the stylus has just contacted a surface and before the stylus has deflected, and some stylus deflection is inevitable, the invention makes use of the method described in European Patent Specification No. 599513 of extrapolating the machine XY and Z readings back to the point at which the probe deflection readings are zero but with some added novel refinements.

Since nominally the probe deflection direction is known, (i.e. it should be the opposite of the direction of movement of the machine), and provided a moderately accurate probe transformation matrix can be supplied for converting the a,b,c probe deflection outputs to incremental X,Y,Z coordinates, the approximate radial component of probe deflection for any touch can be calculated. Therefore, when first measuring a circle in a bore in a part, for each touch around the circle, a first estimate is made of the radial direction from the centre of the circle to the targeted touch point. This determination can be made from the approximate centre position established in the preliminary step outlined above.

In accordance with the method of the invention the probe stylus is driven into contact with the surface of the bore in a direction which is nominally normal to the surface of the bore until the predetermined stylus deflection is reached. The magnitude of this deflection is simply determined by the need to obtain enough data to find a good zero point.

As described above, once the required deflection of the stylus has been achieved, the machine is reversed while simultaneously recording the outputs of the measuring devices of the machine and of the measuring transducers in the probe.

The process is repeated for a number of other points around the surface of the bore, for example, at least 9 but preferably 50 or more are taken to achieve a reasonable distribution around the surface.

Then for each touch, using the probe transformation matrix, the nominal radial component of probe deflection is calculated against the nominal radial component of the machine movement. This will give two series of points in approximately straight lines joined by a transient section as the stylus tip leaves the surface,(illustrated as an overdamped probe response in FIG. 2) and for each series a best fit straight line is calculated. To improve the accuracy of the best fit straight line calculation, points in the transient region near the intersection are preferably omitted.

The just contact position used in the method is defined as the intersection between these two straight lines. The first line has nominally unit slope being the normal component of the probe deflection versus the normal component of machine movement. In an ideal situation these two components should have a 1 to 1 relationship. The second straight line has zero slope, and is the probe deflection after the stylus has left the surface (i.e. zero for a fully zeroed probe) versus the normal component of machine movement. The just contact positions for each of the points around the bore are referred to in machine coordinates as the $X_0$, $Y_0$, $Z_0$ positions.

In case the commanded radial directions were in error, it may be useful to iterate as follows: From the newly acquired set of $X_0$, $Y_0$, $Z_0$ positions a new "actual" centre of the circle can be calculated, and a new radial direction for each touch may be determined,(i.e. from the actual centre to each of the $X_0$, $Y_0$, $Z_0$ positions) New radial components of probe deflection are calculated, new $X_0$, $Y_0$, $Z_0$ points found, and a new centre found and this process is continued until the changes become acceptably small.

However, whilst the normal component relative to the surface of the artefact (radial in the above example when measuring a bore) can be readily found as described above in machine XY and Z coordinates, the same is not necessarily true of the probe outputs unless all of the probe design, construction, and transformation matrix are very accurate. Errors can give rise to the situation illustrated in FIGS. 3 and 4 where it can be seen that a typical sequence of nominally radial probe deflection components do not necessarily form a straight line due in part to stylus stick/slip on the surface. Even using a best fit straight line estimate through the points can give rise to significant errors in the true point of intersection. Thus as an alternative to the above-described analysis technique for finding a new centre, an alternative technique which can be used according to a novel feature of the invention is to analyse the radial deflection plot of the probe for the straightness errors illustrated in FIG. 4, and to rotate the direction (in 3D) until the plot has minimum straightness error.

This can be achieved starting from almost any orientation of probe transformation matrix or any non-radial probing direction by using an algorithm which reviews the accumulated data for the 3D direction of maximum slope in the probe deflection versus the machine radial position plot, irrespective of the apparent direction of probe deflection. The straightness of this plot is assessed. If the error is less than a predetermined tolerance, while the slope is sufficiently close to unity, the extrapolation of this line to the zero slope line will give the intersection point to the required accuracy. If the straightness error is excessive then the algorithm searches for another direction which appears straighter and still has the required slope. The straighter the line gets the more truly normal the direction must be, and the more accurate the extrapolation will be.

The above-described measurement process will produce accurate measurements of the positions of the datum points which contain minimal probe errors, despite probe slippage due to CMM and/or probe errors. From these measurements the centre and radius of the bore can be accurately determined.

Once the positions of the datum points have been accurately determined, the final stage of the calibration can be undertaken.

The bore is scanned several times at a predetermined finite probe stylus deflection, and at a relatively slow speed, ensuring that the probe stylus passes though the same 50 or more datum points.

During the scanning step, the outputs of the measuring transducers of the probe in the a,b, and c axes are transformed into incremental values of X, Y, and Z using the probe transformation matrix referred to above.

The differences between the measurements of the positions of the datum points obtained during the scans and said datum measurements are noted from scan to scan.

The scanning motions nominally through the datum points are repeated at the same nominal stylus deflection, and at greater and greater speeds until the variation in the recorded differences in the measurements between two scans at the same speed becomes excessive relative to a defined tolerance. The last speed at which the variation in the differences fell within the defined tolerance is recorded as the maximum scanning speed.

It is to be understood that the scanning process may start at high speed and be repeated at higher or lower speed depending on the results.

Once the maximum scanning speed has been established in this final stage, a map of the positional errors at the datum points is stored along with the data relating to the scanning speed, the particular artefact or feature, the particular CMM, the particular probe and stylus configuration, and the probe deflection and transformation matrix used.

This map, and associated data, may be stored in the machine's computer, or outside the machine, as part of the part program relating to the specific workpiece. From this map it is then possible to interpolate to obtained radial errors at angles in between the radial directions at which actual data was obtained.

Variations in the friction coefficient between the stylus tip and the workpiece can affect measurement accuracy. If the errors are likely to be significant, it is possible to measure the actual coefficient of friction, e.g. by comparing the direction of the probe deflection vector with the direction of the surface normal determined from the locus of measured points. The sign and scaling of the required measurement compensation, required by changes in the friction coefficient, may be pre-determined, for example, by scanning in two different directions.

It can be seen that the method of the invention avoids the need to calibrate the probe separately, thus saving time and cost in the development of algorithms for faster and more accurate system performance.

Also for the machine user, there are significant time savings by integrating probe calibration, probe static and dynamic mapping and CMM dynamic mapping into one (automatic) operation, and ultimately being able to scan at faster speeds.

Although the invention has been described with reference to the scanning of a circle within a bore, which is a two dimensional problem, the method is more generally applicable and can be used to scan other artifacts or features, including planes or three dimensional artifacts.

Also, although operators of CMMS will usually wish to scan artifacts at the highest scanning speed there is no reason why the data maps recorded at the different scanning speeds should not be stored to enable corrections to be made to scanning data taken at different speeds.

The first steps in the method i.e. finding the datum points have been described with reference to a probe with a workpiece contacting stylus.

If a non-contact probe is used the accurate datum points must be found using the zero error condition of the probe and zero inertial forces on the machine e.g. at constant velocity.

What is claimed is:

1. A method of calibrating a scanning system comprising a measuring machine and a probe, the method comprising the steps of:
    a) moving the probe towards a surface of an artifact, and probing the surface at a number of specific datum points on the surface,
    b) from the probing of step a), making a determination of the positions of each of the datum points,
    c) scanning the probe across the surface of the artifact, nominally passing through the datum points,
    d) from the scanning of step c), making further determinations of the apparent positions of each of the datum points, and recording any differences from the positions determined in step b), and
    e) storing said differences.

2. A method according to claim 1 wherein the probe has a workpiece contacting stylus.

3. A method according to claim 2 wherein, in steps a) and b), the position of the points at the instant that a tip of the stylus is just in contact with the surface is determined by continuing the movement of the probe towards the surface beyond the point at which the stylus first makes contact wish the surface for a predetermined distance while synchronously storing the machine position and the probe deflections at intervals, then extrapolating the stored positions and deflections back to determine the machine position when the probe becomes zero.

4. A method according to claim 2, wherein in steps a) and b), the position of the points at the instant that a tip of the stylus is just in contact with the surface is determined by continuing the movement of he probe towards the surface beyond the point at which the stylus first makes contact with the surface for a predetermined distance, thereafter reversing the movement while synchronously storing the machine positions and the probe deflections at intervals until the stylus lose contact with the surface, then extrapolating the stored positions and deflections back to determine the machine position when the probe deflection first become zero.

5. A method according to claim 1 wherein the determinations of steps b) and d) use the components of the machine movement and of the probe measurement which are normal to the surface.

6. A method according to claim 1 wherein steps c) and d) are repeated at a plurality of different scanning speeds, and further including the step of identifying from the differences recorded in step d) the highest scanning speed at which the variations in the measurements of the positions of the datum points remain within a predetermined tolerance.

7. A method according to claim 1 comprising the additional steps of error mapping the machine of the canning system statically and storing the machine errors obtained for correction of the scanning data.

8. A method of dynamically calibrating a scanning system comprising a measuring machine and a pr be having a workpiece contacting stylus, the method comprising the steps of:
    a) error mapping the machine of the scanning system statically,
    b) determining the diameter of a tip of the stylus and its position relative to the probe,
    c) determining the positions of a plurality of datum points on a surface of an artifact with the probe stylus in contact with said surface and when at least the component of the stylus deflection normal to the surface is zero,
    d) scanning the surface of the artifact passing through the datum points at a nominal stylus deflection an at a speed at which the results are repeatable within a given tolerance,
    e) subtracting the positions of the datum points determined with zero normal deflection of the stylus from the positions of the datum points produced during the scanning step to determine the measurement errors attributable to the scanning process in the direction normal to the surface at the nominal deflection, and
    f) storing the error or values for subsequent correction of measurements taken on a similar artifact at the same speed and deflection.

* * * * *